United States Patent
Jonsson

(10) Patent No.: US 8,998,325 B2
(45) Date of Patent: Apr. 7, 2015

(54) SEAT CARRIER ARRANGEMENT

(71) Applicant: Volvo Car Corporation, Gothenburg (SE)

(72) Inventor: Tony Jonsson, Alingsas (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 13/890,046

(22) Filed: May 8, 2013

(65) Prior Publication Data

US 2013/0300164 A1 Nov. 14, 2013

(30) Foreign Application Priority Data

May 8, 2012 (EP) ..................................... 12167104

(51) Int. Cl.
| | |
|---|---|
| *B60N 2/42* | (2006.01) |
| *B60N 2/12* | (2006.01) |
| *B60R 21/013* | (2006.01) |
| *B60R 21/0134* | (2006.01) |
| *B60R 21/0136* | (2006.01) |
| *B60N 2/427* | (2006.01) |
| *B60N 2/02* | (2006.01) |
| *B60N 2/16* | (2006.01) |

(52) U.S. Cl.
CPC .......... *B60N 2/42727* (2013.01); *B60N 2/0276* (2013.01); *B60N 2/4228* (2013.01); *B60N 2/42736* (2013.01); *B60N 2/1615* (2013.01)

(58) Field of Classification Search
USPC ............. 297/344.15, 344.16, 344.17, 216.15, 297/216.16, 216.18, 216.19
See application file for complete search history.

(56) References Cited

U.S. PATENT DOCUMENTS

| | | | |
|---|---|---|---|
| 3,799,609 A | 3/1974 | Cunningham | |
| 5,882,061 A * | 3/1999 | Guillouet | 297/344.15 X |
| 6,193,296 B1 * | 2/2001 | Motozawa et al. | 297/216.16 X |
| 6,347,778 B1 * | 2/2002 | Koga et al. | 297/344.17 X |
| 6,425,557 B1 * | 7/2002 | Becker et al. | 297/344.15 X |
| 6,435,591 B1 * | 8/2002 | Nilsson | 297/216.15 X |
| 6,435,592 B2 * | 8/2002 | Nilsson | 297/216.15 X |
| 6,517,157 B1 * | 2/2003 | Vorac | 297/344.15 X |

(Continued)

FOREIGN PATENT DOCUMENTS

| | | |
|---|---|---|
| DE | 19648974 A1 | 5/1997 |
| EP | 1612090 A1 | 1/2006 |

(Continued)

OTHER PUBLICATIONS

European Patent Office, Extended European Search Report of EP12167104.4, Germany, Sep. 14, 2012, 6 pages.

*Primary Examiner* — Rodney B White
(74) *Attorney, Agent, or Firm* — Alleman Hall McCoy Russell & Tuttle LLP

(57) ABSTRACT

A vehicle seat carrier for a vehicle seat comprises a position adjustment arrangement adapted to enable the vehicle seat carrier to be displaced between a plurality of different positions and a position lock adapted to retain the vehicle seat carrier at a selected position. The position lock is adapted to be disabled as a response to a detected crash, or a detected imminent crash, so that the vehicle seat carrier is permitted to be displaced along a first path at least partly defined by the position adjustment arrangement, to provide for a passenger protective function. The passenger protective function utilizes the existing position adjustment arrangement to provide for a controlled displacement during a collision.

12 Claims, 6 Drawing Sheets

(56) References Cited

U.S. PATENT DOCUMENTS

| | | | |
|---|---|---|---|
| 6,578,920 B2* | 6/2003 | Delmas et al. | 297/344.17 |
| 6,752,455 B2* | 6/2004 | Teufel et al. | 297/344.15 X |
| 6,902,234 B2* | 6/2005 | Becker et al. | 297/344.15 X |
| 7,300,108 B2* | 11/2007 | Canteleux | 297/344.15 |
| 7,604,293 B2* | 10/2009 | Matsuhashi | 297/216.16 X |
| 7,717,509 B2* | 5/2010 | Kojima | 297/344.15 X |
| 7,766,427 B2* | 8/2010 | Kojima et al. | 297/344.15 |
| 7,984,950 B2* | 7/2011 | Hoshi et al. | 297/344.15 X |
| 8,172,326 B2* | 5/2012 | Adragna et al. | 297/344.17 |
| 8,353,558 B2* | 1/2013 | Okamoto et al. | 297/344.15 X |
| 8,590,971 B2* | 11/2013 | Ito et al. | 297/344.15 |
| 8,616,645 B2* | 12/2013 | Ito | 297/344.17 |
| 2001/0015565 A1* | 8/2001 | Motozawa et al. | 297/216.18 |
| 2005/0134100 A1 | 6/2005 | Canteleux et al. | |
| 2006/0001306 A1* | 1/2006 | Becker et al. | 297/344.15 |
| 2009/0312916 A1 | 12/2009 | Rao | |
| 2011/0025106 A1* | 2/2011 | Okamoto et al. | 297/216.1 |
| 2011/0260482 A1 | 10/2011 | Bourgraf et al. | |
| 2012/0286553 A1* | 11/2012 | Sharda et al. | 297/344.15 |

FOREIGN PATENT DOCUMENTS

| | | |
|---|---|---|
| FR | 2796602 A1 | 1/2001 |
| WO | 0053452 A1 | 9/2000 |

\* cited by examiner

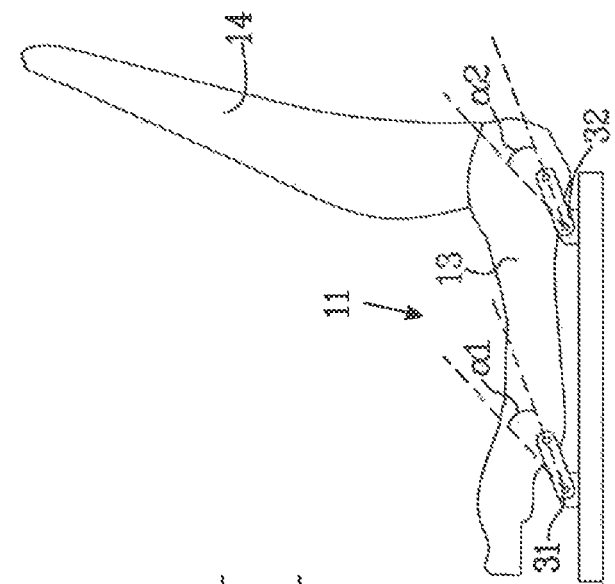
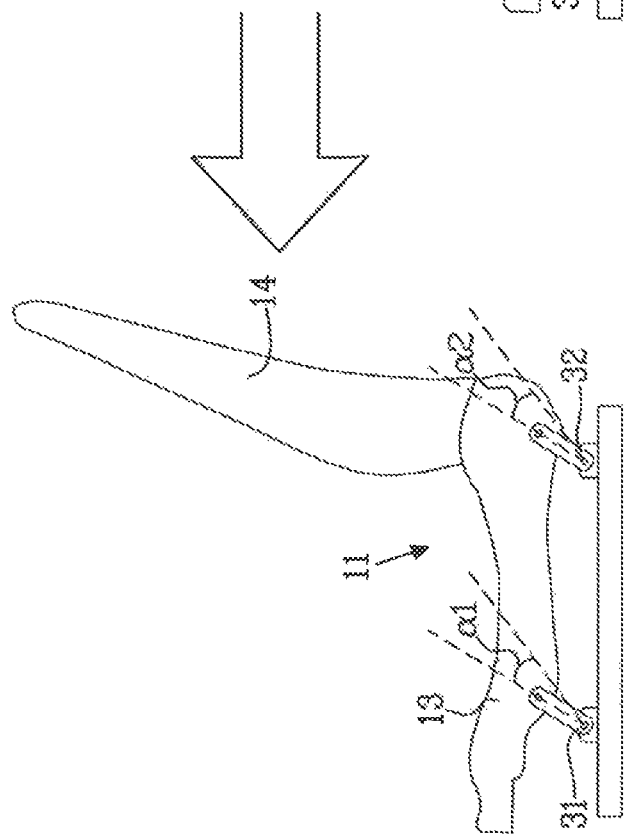

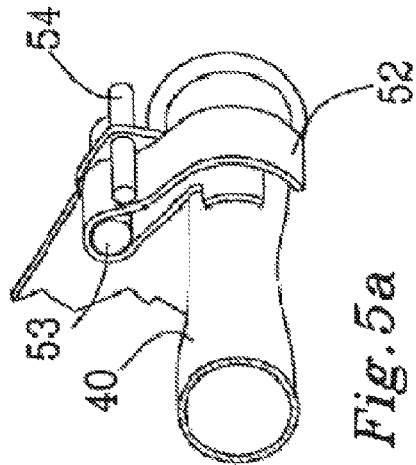
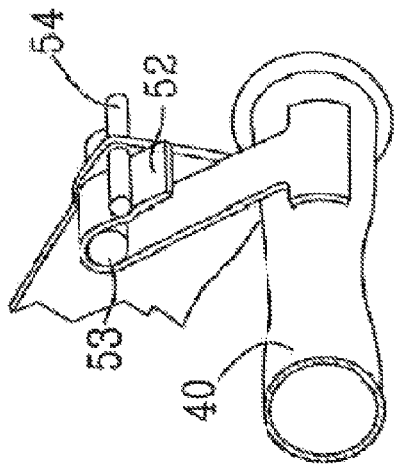
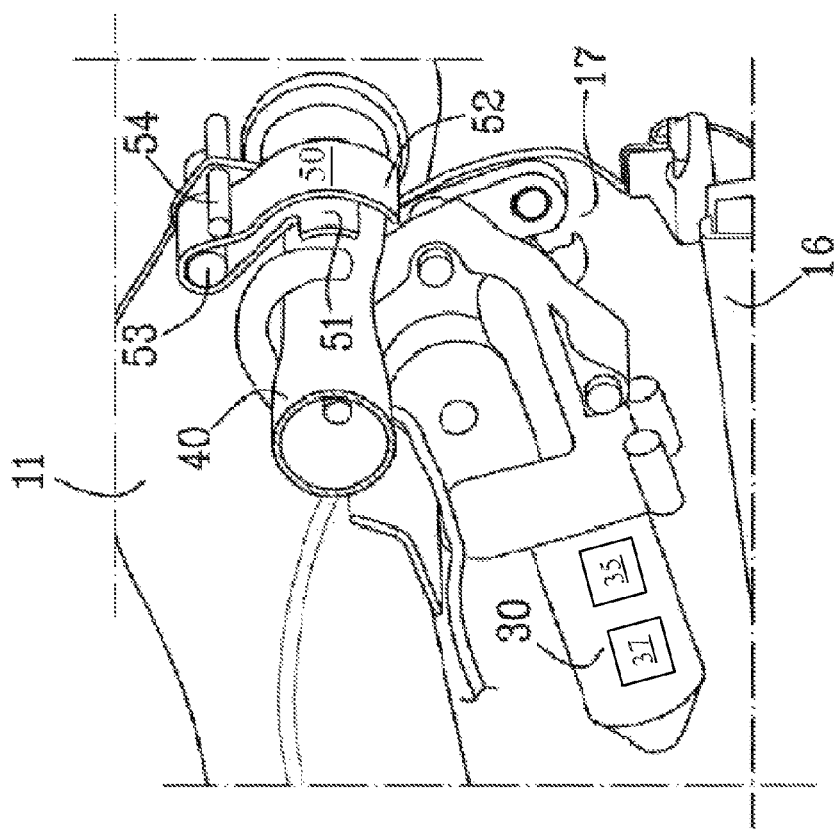

SEAT CARRIER ARRANGEMENT

CROSS REFERENCE TO RELATED APPLICATIONS

The present application claims priority to European Patent Application No. 12167104.4, filed on May 8, 2012, the entire contents of which are hereby incorporated by reference for all purposes.

TECHNICAL FIELD

The present invention relates to a vehicle seat carrier for a vehicle seat. The position of the vehicle seat carrier can be adjusted to provide for a comfortable position for a passenger. The vehicle seat carrier is further adapted to respond to a crash, or imminent crash, to provide for a passenger protective function.

BACKGROUND

Vehicle seats having a built in protective system to protect the passenger positioned in the vehicle seat have been in development for several years. Whiplash, or whiplash associated disorder (WAD), is a term describing a range of injuries and symptoms which are common among injured passengers in vehicle accidents. It is common that WADs occur as a result of an object colliding into the rear of the vehicle, i.e. a rear collision, and in these circumstances they are also referred to as cervical acceleration-deceleration injuries. During a sudden acceleration from a colliding object having a velocity as low as about 6-8 km/h, a passenger's sensitive neck is subjected to a weight 4-5 times the normal weight. The sudden increase can force the spine to adopt an unfavorable form which in the end stretches or extends the spine. Patients having WAD usually tend not to have any visible injuries to the ligaments, discs, muscles or joints which makes the treatment difficult. It can be very difficult and painful for patients having WAD, while at the same time WAD imparts high costs to society in the form of health care and rehabilitation system costs.

One factor which affects the risk of acquiring WAD is how the vehicle seat is positioned, i.e. the position of the seat, back rest and head rest. Different car manufacturers have approached this problem differently: some use an active head restraint, while some use a system commonly referred to as WHIPS, or whiplash protection/prevention system.

In the publication of WO 00/53452 A1 to Autoliv A B, a seat carrier is disclosed. The seat carrier comprises a kinetic energy absorber. In case of a rear impact, the seat carrier is adapted to pivot and the kinetic energy absorber is intended to absorb some of the forces imparted to the sear carrier due to a collision. The kinetic energy absorber is arranged on a support structure beneath the seat and is very space consuming and requires a high number of individual components to operate properly.

SUMMARY

It is an objective of the present invention to provide for an improved vehicle seat carrier or at least a useful alternative. The objective is at least partly met by a vehicle seat carrier for a vehicle seat. The vehicle seat carrier comprises a position adjustment arrangement adapted to enable the vehicle seat carrier to be displaced between a plurality of different positions, e.g. displaced vertically and/or horizontally. A position lock is adapted to retain the vehicle seat carrier at a selected position. An electrical motor, or mechanism, is adapted to operate the vehicle seat carrier to move between the plurality of different positions as a response to a user issued command. The position lock is further adapted to be disabled in response to a detected crash, or a detected imminent crash, so that the vehicle seat carrier is permitted to be displaced along a first path at least partly defined by said position adjustment arrangement, to provide for a passenger protective function.

The vehicle seat carrier may be retrofitted to uses an already existing position adjustment arrangement to provide for a passenger protective function, such as whiplash protection or whiplash prevention. The protective function is thus imparted without an excessive amount of components, reducing manufacturing and material costs, weight and space.

A user issued command can be a user pushing a button, pulling a lever, issuing a voice command or the like.

According to an aspect, the vehicle seat carrier comprises at least one, at least two or at least four pivot arms adapted to enable the vehicle seat carrier to be displaced between the plurality of different positions, e.g. vertically displaced and/or horizontally displaced. Further, the vehicle seat carrier may be radially displaced, where radial displacement refers to a superposed displacement both in a vertical direction and in a horizontal direction.

According to an aspect the vehicle seat carrier is permitted to be radially displaced along a first path at least partly defined by said position adjustment arrangement.

According to an aspect, the at least first and second pivot arms define the first path along which the vehicle seat carrier is displaced.

According to an aspect, the vehicle seat carrier is pivotable about at least a first, second, third and fourth pivot arm, where the first, second, third and fourth pivot arms are connected to the vehicle seat carrier at a first, second, third, and fourth pivot point respectively. The first, second, third and fourth pivot arms define the first path.

According to an aspect, the first, second, third, and fourth pivot points are fixed pivot points with respect to the vehicle seat carrier.

According to an aspect, the electrical motor comprises a rotatable driving shaft, wherein the rotatable driving shaft is adapted to cooperate with the vehicle seat carrier at a working point or section, wherein the working point or section is adapted to be disengaged from the vehicle seat carrier, whereby the position lock is disabled.

According to an aspect, the position lock is adapted to respond to a sensor based signal, the sensor based signal indicating a crash or an imminent crash.

According to an aspect, the electrical motor comprises a rotatable driving shaft, wherein the position lock disengages the rotatable driving shaft from the drive, permitting the rotatable driving shaft to be substantially freely rotatable.

According to an aspect, the electrical motor comprises a rotatable driving shaft and a shaft brake, wherein the position lock is disabled by disengaging the shaft brake.

According to an aspect, the displacement of the vehicle seat carrier along the first path is restrained by a deformation element, a resisting element, and/or the electrical motor.

BRIEF DESCRIPTION OF THE DRAWINGS

Non-limiting embodiments of the present invention will be described with reference to the accompanying figures in which:

FIG. 3a is a simplified depiction of the vehicle seat carrier of FIG. 2a with a view towards the side before a collision;

FIG. 3b is a simplified depiction of the vehicle seat carrier of FIG. 3a with a view towards the side after a collision;

FIG. 4 shows parts of the vehicle seat carrier and an embodiment of a force limiting arrangement in greater detail;

FIG. 5a shows the force limiting arrangement of FIG. 4 during a collision;

FIG. 5b shows the force limiting arrangement of FIG. 4 after a collision;

DETAILED DESCRIPTION OF PREFERRED EMBODIMENTS

Figure 1:
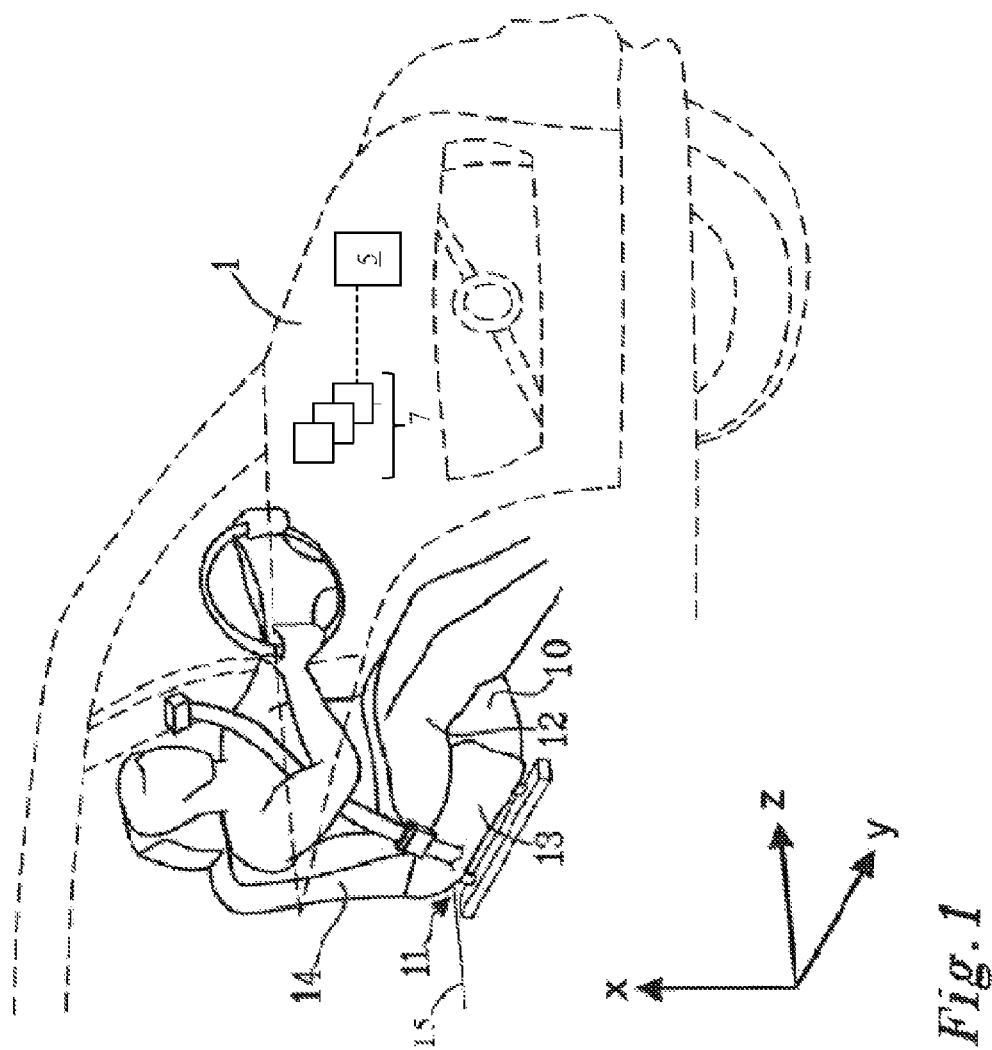
FIG. 1 shows a schematic view of a driver/passenger position on a vehicle seat inside of a car.

FIG. 1 shows, slightly transparent and with dashed lines, a vehicle 1 in the form of a car. A displaceable vehicle seat 10 comprises a vehicle seat carrier 11 (only partly shown). A driver 12 is positioned on a seat 13 comprising a cushion, displaceably arranged via the vehicle seat carrier 11 between different positions. A back rest frame 14 comprising a back rest cushion is pivotally connected to the vehicle seat carrier 11. The position of the vehicle seat 10 can be adjusted in the vehicle height direction along an X-axis and in the vehicle longitudinal direction along a Y-axis, as indicated in FIG. 1, for the purpose of providing a comfortable position for the driver 12. It should be noted that the vehicle seat 10 does not need to be at the driver's position, but can be positioned elsewhere (e.g. in front or rear passenger positions).

Figure 2A:
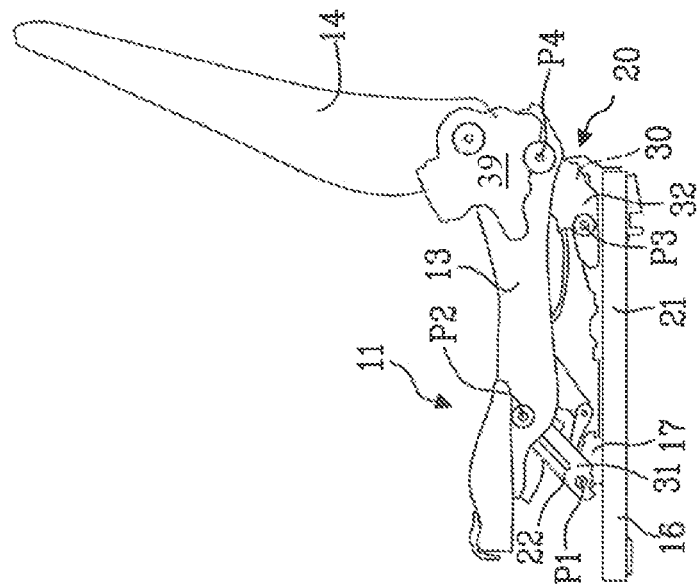
FIG. 2a shows a vehicle seat carrier according to an embodiment with a view in perspective.
Figure 2B:
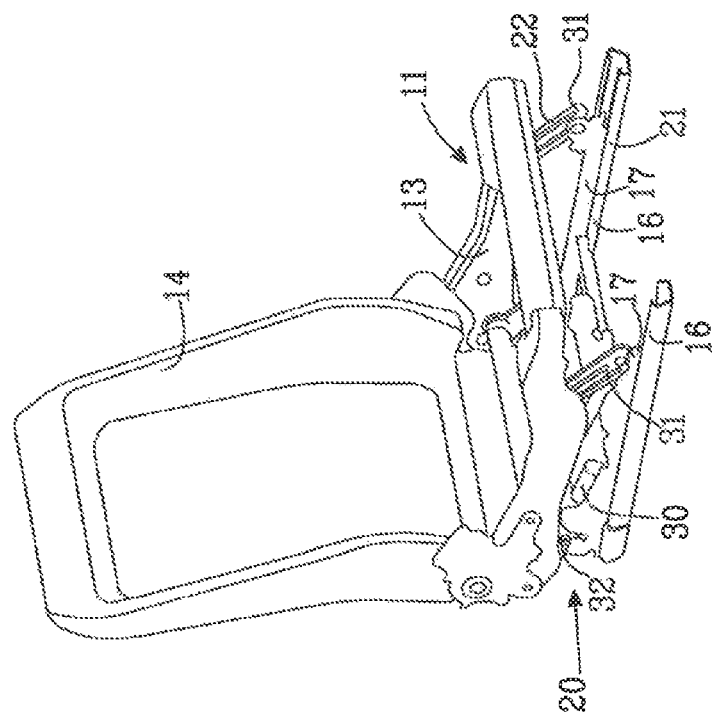
FIG. 2b shows the vehicle seat carrier of FIG. 2a with a view towards the side.

To permit the driver 12 to adjust the position of the vehicle seat 10, the vehicle seat carrier 11 comprises a position adjustment mechanism 20, better shown in FIGS. 2a-2b which show the vehicle seat carrier 11 in greater detail. The position adjustment mechanism 20 comprises a longitudinal adjustment mechanism 21 and a height adjustment mechanism 22. The longitudinal adjustment mechanism 21 enables the vehicle seat 10 to be slideably displaced in the longitudinal direction and is attached on a floor portion 15 of the vehicle 1, in this case via a pair of first slats 16, each first slat 16 in working cooperation with a corresponding opposing slat of a pair of second slats 17 arranged on the vehicle seat carrier 11. The first and second pairs of slats 16, 17 permit the position of the vehicle seat carrier 11 to be slideably adjusted along the Y-axis (in the longitudinal direction of the vehicle). The first slats 16 are coupled to the vehicle floor portion 15 while the second slats 17 are coupled to the vehicle seat carrier 11 as mentioned above.

The back rest frame 14 is pivotally connected to the vehicle seat carrier 11 to permit the angle of the back rest frame 14 to be adjusted with respect to the vehicle seat carrier 11.

The vehicle seat carrier 11 is further adapted to be displaced along the X-axis (in the direction of the height of the vehicle). Each of the second slats 17 are associated with a first and second pivot arm 31, 32, which also can be referred to as the front pivot arm 31 and the rear pivot arm 32. As shown in FIG. 2a, a pair of first and second pivot arms 31, 32 is arranged on each side of the vehicle seat carrier 11 and adapted to pivot about a pivot point on the corresponding second slat 17 of the vehicle seat carrier 11. The pivot points on each side of the vehicle seat carrier 11 are referred to as P1-P4. The vehicle seat carrier 11 thus comprises four pivot points on each side, including two pivot points P2 (front), P4 (rear) on each side of the seat frame 13, and two pivot points P1 (front), P3 (rear) on each of the second slats 17. In this context, it will be appreciated that the "front" pivot points are located closer to the front of the vehicle in the longitudinal direction, whereas the "rear" pivot points are located closer to the rear of the vehicle in the longitudinal direction.

When the electrical motor 30 is actuated, the vehicle seat carrier 11 can be raised or lowered along a first path, depending on the desired position. It can generally be displaced between a first and a second position. The first position is a floor position at which the first and the second pivot arms 31, 32 are substantially horizontal, i.e. substantially parallel with the slats 16, and the second position is an elevated position at which the first and the second pivot arms 31, 32 are substantially vertical, i.e. substantially perpendicular to the slats 16. A position lock retains the vehicle seat carrier 11 in the selected position. Instead of an electrical motor, a mechanism can be used, such as a lever mechanism or the like. Such mechanisms may require a user to physically lever the vehicle seat carrier to an appropriate raised position.

The vehicle seat carrier 11 is adapted to provide for a passenger protective function, or at least a collision protective function protecting against whiplash injuries. If the vehicle 1 collides, or if an object collides with the vehicle 1, the vehicle seat carrier 11 is adapted to respond in such a manner as to provide the passenger protective function. To enable an appropriate response, the position lock of the vehicle seat carrier 11 is adapted to be disabled. In one example, the position lock may be disabled by disengagement of a working point or section, such as working point or section 39 shown in FIG. 2b, from the vehicle seat carrier. Further, a rotatable driving shaft 33 of electrical motor 30, described below with reference to FIG. 7, may cooperate with the vehicle seat carrier at a working point or section.

The position lock is adapted to respond to a specific situation such as a crash (e.g. the vehicle 1 colliding against another object, or another object colliding with the vehicle 1) and/or an imminent crash. For example, a sensor system including at least one sensor 7 (schematically shown in FIG. 1) may detect a second vehicle or object which is about to collide with the vehicle 1. The mentioned object(s) could be another vehicle, a mammal or a stationary object such as a tree, rock, house or similar. One example sensor system is described in US Publication No. 2009/312916 (A1). Non-limiting examples of such sensors include front and/or rear radars, closing velocity sensors (e.g. using multiple-channel laser sensors), and infrared (IR) lasers. The laser sensors can be implemented in rear view windscreen electronic modules (RWEM), thereby potentially benefiting from physical protection by way of such rear view windscreens as well as being provided a potentially clear field of view as desired by drivers for their rear view windscreens. As shown in FIG. 1, the sensor(s) 7 may communicate with an electronic control unit (ECU) 5. ECU 5 may be a CPU or an onboard vehicle computer, and optionally a driver information module if desirable.

As a response to a sensor detected event, the position lock is adapted to be disabled. If the position lock is formed by the electrical motor 30, the position lock is disabled by disengaging the locking function imparted via the electrical motor 30. The electrical motor 30 is thus disengaged so that the vehicle seat carrier 11 is permitted to be displaced to provide for a passenger protective function.

The vehicle seat carrier 11 is displaced along the same first path as during an ordinary vehicle seat 10 adjustment, e.g. between the floor position and the elevated position. In this manner, the same components which are used to adjust the position of the vehicle seat carrier 11 are used for providing a passenger protective function by defining the available displacement path for the vehicle seat carrier 11.

FIGS. 3a-3b schematically show the vehicle seat carrier 11 to illustrate the displacement of the vehicle seat carrier 11 and the seat frame 13. The first and the second pivot arms 31, 32 are further visible. In FIG. 3a, the vehicle seat carrier 11 is positioned in a ready to use position, e.g. comfortably adjusted to accommodate a passenger or a driver via the position adjustment mechanism 20. In this case, the ready to use position is somewhere between the first position, i.e. the floor position, and the second position, i.e. the elevated position, although it is closer to the elevated position than the floor position.

A simplified crash scenario will be described together with the vehicle seat carrier 11 of FIGS. 3a-3b. If an object, such as a second vehicle, collides with the vehicle 1, in a direction indicated by the arrow in FIG. 3a, i.e. into the rear of the vehicle 1 in the longitudinal direction, vehicle systems (not shown) detect the collision or the imminent collision. The vehicle systems disable the position lock so as to enable the vehicle seat carrier 11 to be displaced, in this case to pivot about each pair of first and second pivot arms 31, 32 to an impact position in the proximity of the floor position. The pivot motion is possible due to the inertia of the vehicle seat carrier 11 and the passenger sitting on the vehicle seat 10. When the position lock has been disabled, the vehicle seat carrier 11 will accelerate slower than the vehicle due to the impact of the second vehicle, and thus travel with a slightly slower speed than the remainder of vehicle 1 due to the inertia of the passenger and the vehicle seat carrier 11. The vehicle seat carrier 11 is thus forced to travel along the path provided by the first and the second pivot arms 31, 32, i.e. the path provided by the vehicle position adjustment mechanism 20. The displacement of the vehicle seat carrier 11 relative to the vehicle 1 will reduce the risk for injuries during the crash, and especially whiplash injuries. The position adjustment mechanism is actuated via an electrical motor 30 which adjusts the vehicle seat frame 13 in the vehicle height direction, i.e. the vertical direction. Suitable angles $\alpha_1$ and $\alpha_2$ are selected to be about 5-30, preferably 7-20, more preferably 7-15 degrees. This will displace the back rest 14 a sufficient length for providing an improved protection against injury. The angles $\alpha_1$ and $\alpha_2$ are advantageously equal ($\alpha_1=\alpha_2$), substantially equal ($\alpha_1 \approx \alpha_2$), or non-equal (e.g. $\alpha_1 < \alpha_2$ or $\alpha_1 > \alpha_2$).

In the depicted embodiment, the position lock is formed by the electrical motor 30. To disable the position lock in this embodiment, the electrical motor needs to be disabled. Different ways of disabling the electrical motor 30 will be described in greater detail below.

To further improve the passenger protection function of the vehicle seat carrier 11, the vehicle seat carrier 11 can be provided with a force limiting arrangement. Examples of such a force limiting arrangement can be a deformation element, a resisting element, the electrical motor, or the like. The force limiting arrangement is adapted to reduce the displacement velocity of the vehicle seat carrier during an impact by absorbing some of the kinetic energy which the vehicle seat carrier 11 has during a collision. The vehicle seat carrier 11 is however still permitted to be displaced.

An embodiment of a force limiting arrangement is shown in FIG. 4. FIG. 4 shows a part of the vehicle seat carrier 11, a part of the first slat 16 coupled to the vehicle floor (not shown), a part of the second slat 17 coupled to the vehicle seat carrier 11, and the electrical motor 30 adapted to actuate the displacement of the vehicle seat carrier 11. Coupled to the vehicle seat carrier 11 is a side impact protection system (SIPS) tube 40. The SIPS tube 40 comprises an air bag adapted to be deployed in case of an object colliding with the vehicle 1 from the side to protect the passenger in the vehicle seat 10. A force limiter in the form of a deformable plate 50 is arranged on the SIPS tube 40.

The deformable plate 50 is adapted to be deformed as the vehicle seat carrier 11 is displaced relative to the second slat 17. The deformable plate 50 has an elongated extension with a proximal end 51 attached to the SIPS tube 40 and a distal end 52. The deformable plate 50 is further bent about a first pin 53 and extends between the first pin 53 and a second pin 54. During displacement, the position of the first and the second pins 53, 54 remains unchanged while the deformable plate slips between the first and second pins 53, 54 as schematically shown in FIGS. 5a-5b. While FIG. 4 shows a position before impact, or collision, i.e. before the vehicle seat carrier 11 has been displaced, FIG. 5a show a position half way through the displacement, and FIG. 5b shows a position at the end of displacement.

The deformable plate 50 can be made of sheet metal such as sheet steel, spring steel or similar. The thickness, width and length can vary dependent on the desired properties but the deformable plate 50 is suitably selected so that a threshold deformation force is approximately 3 kN (3000 N) and a force maximum is approximately 15 kN. The deformable plate is thus operating substantially in the interval of 3-15 kN. The deformable plate 50 can optionally be adapted for other force intervals such as 3-12 kN, 4-10 kN, or 6-9 kN, for example.

Figure 6C:
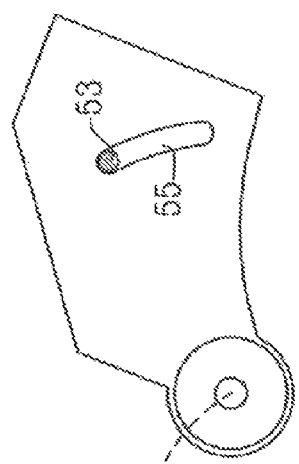
FIGS. 6a-6f show additional embodiments of force limiting arrangements.
Figure 6F:
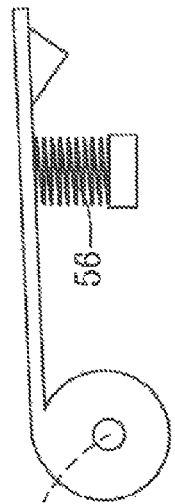
Figure 6B:
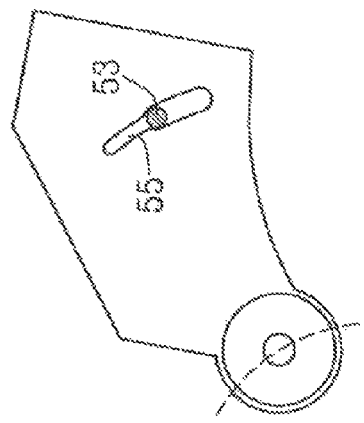
Figure 6E:
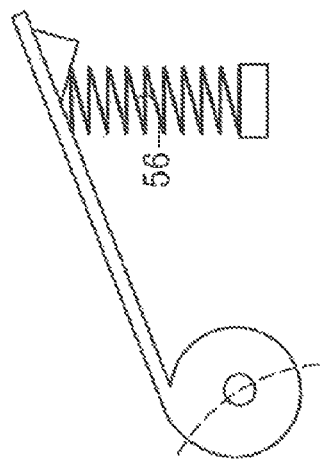
Figure 6A:
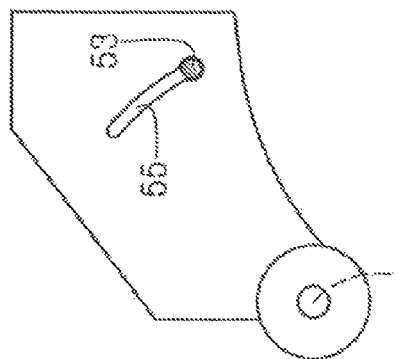
Figure 6D:
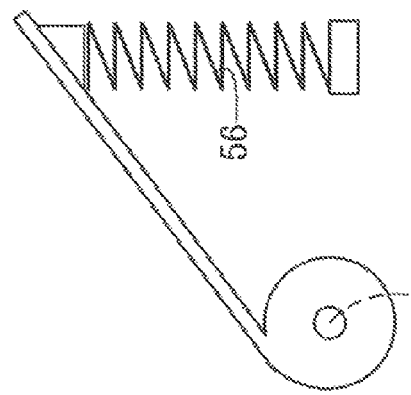

Other suitable force limiters are schematically presented in the FIGS. 6a-6f, in which FIGS. 6a-6c show a deformable force limiter using the principle of the first pin 53 sliding in a slot 55 which is adapted to deform as the pin 53 travels along the length of the slot 55 as is illustrated in the FIGS. 6b-6c. In FIG. 6b the pin 53 has traveled substantially 50% of the slot 55 length, while in FIG. 6c the pin 53 has traveled substantially 100% along the length of the slot 55. At this position, the vehicle seat carrier 11 is prevented from further relative displacement. FIGS. 6d-6f shows another embodiment in which a resilient member 56 is used to reduce the displacement velocity. The deformation force threshold level of such a member is however lower than, and not as distinct as, the deformation force level for the above mentioned embodiments.

By selecting a relatively high threshold force level, the risk for accidental displacement is effectively prevented or at least reduced. However, the force limiter, i.e. the deformable plate 50 in this case, should not be too strong or rigid, as the effect of the displacement of the vehicle seat carrier 11 is reduced or completely removed, at least within a critical force level to protect a passenger against whiplash injuries, or to reduce whiplash injuries. As the force limiter should be selected with both of these parameters in mind, the above mentioned intervals for the deformable plate 50 are deemed suitable.

In the shown embodiment, the adjustment of the vehicle seat carrier 11 in the vehicle height direction is actuated by an electrical motor 30. The electrical motor 30 can be actuated by the driver 12, e.g. by the driver actuating a seat position control button, or by other means.

Figure 7:
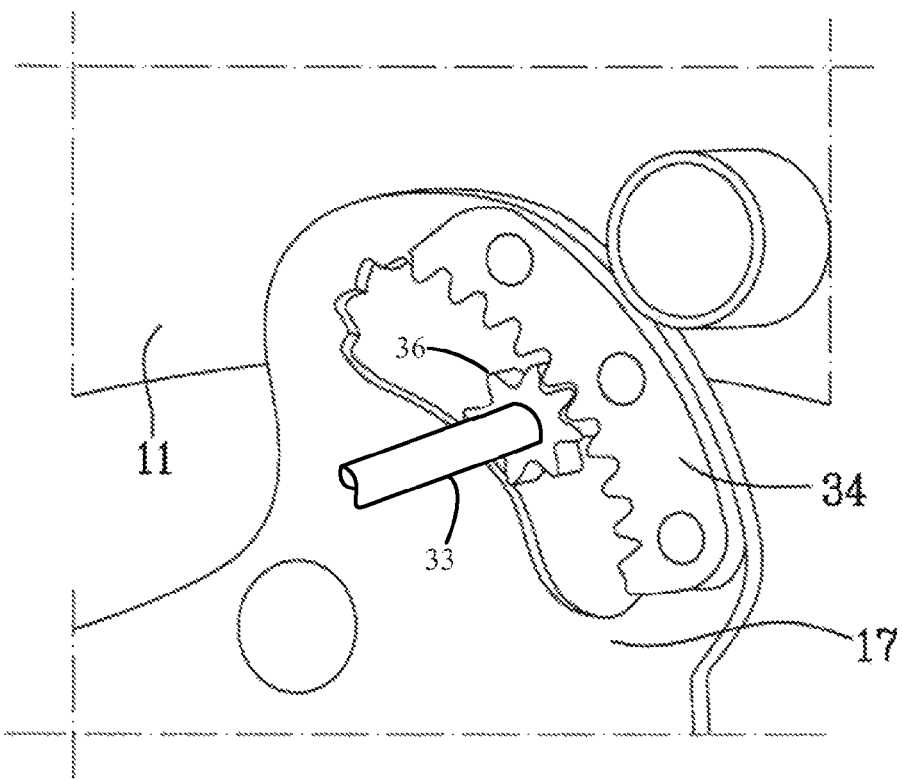
FIG. 7 is a detailed view of a part of a second slat of the vehicle seat carrier.

FIG. 7 shows a part of the second slat 17 in greater detail. The electrical motor 30 comprises a driving shaft 33 which upon rotation can raise or lower the seat 13 along the vehicle height direction, i.e. the X-axis, by raising or lowering a section of the vehicle seat carrier 11. A cog wheel 36 is arranged on the driving shaft which is adapted to cooperate with a cog member 34 arranged on the vehicle seat carrier 11.

The electrical motor 30 further comprises a shaft brake 35 and a drive 37, which are schematically shown in FIG. 4.

The position lock can be adapted to be disabled in different ways. The electrical motor 30 can be disengaged from the driving shaft 33, the cog wheel 36 can be disengaged from the driving shaft 33, or the cog member 34 can be disengaged from the vehicle seat carrier 11, for example. The electrical motor 30 can be put in a neutral gear to permit the driving shaft 33 to rotate freely. As mentioned above, the electrical motor 30 can also be used as a force limiting arrangement by using the electrical motor to brake, i.e. retard, the displacement of the vehicle seat carrier 11 during a collision.

When the position lock is disabled, the vehicle seat carrier 11 can be displaced along a first path. The first path is defined by the available path provided by the position adjustment mechanism. By displacing the vehicle seat carrier 11, and thus the seat 13, a passenger protective function is provided. In case of a rear collision, e.g. a second vehicle crashing into the rear of the vehicle 1, the passenger protective function can be a whiplash protective function.

The invention claimed is:

1. A vehicle seat carrier for a seat of a vehicle, said vehicle seat carrier adapted to be displaced between a plurality of different positions, said vehicle seat carrier comprising a position lock adapted to retain said vehicle seat carrier at a selected position, and a mechanism adapted to operate said vehicle seat carrier between said plurality of different positions responsive to a user issued command, wherein said position lock is adapted to be disabled responsive to a detected crash, or a detected imminent crash, so that said vehicle seat carrier is permitted to be displaced along a first path to provide for a passenger protective function, and wherein said mechanism is an electrical motor comprising a rotatable driving shaft and a shaft brake, wherein said position lock comprises said electrical motor, and wherein said position lock is disabled by disengaging said shaft brake.

2. The vehicle seat carrier according to claim 1, wherein said vehicle seat carrier comprises at least one pivot arm adapted to enable said vehicle seat carrier to be displaced between said plurality of different positions.

3. The vehicle seat carrier according to claim 1, wherein said at least one pivot arm comprises at least a first and a second pivot arm adapted to enable said vehicle seat carrier to be displaced between said plurality of different positions.

4. The vehicle seat carrier according to claim 3, wherein said vehicle seat carrier is pivotable about at least said first and second pivot arms, and wherein at least said first and second pivot arms define said first path.

5. The vehicle seat carrier according to claim 4, wherein said vehicle seat carrier is further pivotable about at least a third and a fourth pivot arm, said first, second, third and fourth pivot arms being connected to said vehicle seat carrier at a first, a second, a third, and a fourth pivot point respectively, and wherein at least said first, second, third and fourth pivot arms define said first path.

6. The vehicle seat carrier according to claim 5, wherein said first, second, third, and fourth pivot points are fixed pivot points with respect to said vehicle seat carrier.

7. The vehicle seat carrier according to claim 1, wherein said vehicle seat carrier is adapted to pivot about said at least one pivot arm upon said displacement along said first path.

8. The vehicle seat carrier according to claim 1, wherein said displacement of said vehicle seat carrier along said first path is restrained by a deformation element, resisting element, and/or by an electrical motor.

9. The vehicle seat carrier according to claim 1, wherein said vehicle seat carrier is permitted to be radially displaced along said first path.

10. A vehicle seat carrier for a seat of a vehicle, said vehicle seat carrier adapted to be displaced between a plurality of different positions, said vehicle seat carrier comprising a position lock adapted to retain said vehicle seat carrier at a selected position, and a mechanism adapted to operate said vehicle seat carrier between said plurality of different positions responsive to a user issued command, wherein said position lock is adapted to be disabled responsive to a detected crash, or a detected imminent crash, so that said vehicle seat carrier is permitted to be displaced along a first path to provide for a passenger protective function, wherein said mechanism is an electrical motor comprising a rotatable driving shaft and a drive, wherein said position lock comprises said electrical motor, wherein said position lock is disabled by disengaging said rotatable driving shaft from said drive, and wherein said rotatable driving shaft is substantially freely rotatable when disengaged from said drive.

11. A vehicle seat carrier for a seat of a vehicle, said vehicle seat carrier adapted to be displaced between a plurality of different positions, said vehicle seat carrier comprising a position lock adapted to retain said vehicle seat carrier at a selected position, and a mechanism adapted to operate said vehicle seat carrier between said plurality of different positions responsive to a user issued command, wherein said position lock is adapted to be disabled responsive to a detected crash, or a detected imminent crash, so that said vehicle seat carrier is permitted to be displaced along a first path to provide for a passenger protective function, wherein said mechanism is an electrical motor comprising a rotatable driving shaft, wherein said rotatable driving shaft is adapted to cooperate with said vehicle seat carrier at a working point or section, wherein disengagement of said working point or section from said vehicle seat carrier disables said position lock.

12. The vehicle seat carrier according to claim 1, wherein said position lock is adapted to be disabled as a response to at least one sensor, said at least one sensor being adapted to detect a crash or an imminent crash.

* * * * *